US011202189B2

(12) United States Patent
Oh

(10) Patent No.: US 11,202,189 B2
(45) Date of Patent: Dec. 14, 2021

(54) INFOTAINMENT SYSTEM FOR EMERGENCY RESCUE REQUEST NOTIFICATION AND METHOD THEREOF

(71) Applicants: HYUNDAI MOTOR COMPANY, Seoul (KR); KIA MOTORS CORPORATION, Seoul (KR)

(72) Inventor: Hyung Suk Oh, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/029,470

(22) Filed: Sep. 23, 2020

(65) Prior Publication Data

US 2021/0160676 A1    May 27, 2021

(30) Foreign Application Priority Data

Nov. 22, 2019   (KR) .................. 10-2019-0151421

(51) Int. Cl.
*H04W 4/90*     (2018.01)
*H04W 4/12*     (2009.01)
*G08B 25/10*    (2006.01)
*H04W 4/80*     (2018.01)

(52) U.S. Cl.
CPC .............. *H04W 4/90* (2018.02); *G08B 25/10* (2013.01); *H04W 4/12* (2013.01); *H04W 4/80* (2018.02)

(58) Field of Classification Search
CPC ..................................... H04W 4/90

USPC ........................................ 455/404.1
See application file for complete search history.

(56) References Cited

U.S. PATENT DOCUMENTS

| | | | | |
|---|---|---|---|---|
| 2010/0162120 | A1* | 6/2010 | Niizawa ................ | G06F 3/0482 715/727 |
| 2010/0222066 | A1* | 9/2010 | Du ........................ | H04W 28/18 455/450 |
| 2012/0264385 | A1* | 10/2012 | Oh ........................ | H04H 20/22 455/160.1 |
| 2015/0118990 | A1* | 4/2015 | Best ................... | G08G 1/096775 455/404.2 |
| 2017/0018182 | A1* | 1/2017 | Makled ............ | G08G 1/096716 |
| 2019/0132395 | A1* | 5/2019 | Hopkins ................ | H04L 67/04 |

FOREIGN PATENT DOCUMENTS

| | | |
|---|---|---|
| KR | 2017-0029194 A | 3/2017 |
| KR | 2017-0059508 A | 5/2017 |

\* cited by examiner

*Primary Examiner* — Qutbuddin Ghulamali
(74) *Attorney, Agent, or Firm* — McDonnell Boehnen Hulbert & Berghoff LLP

(57) ABSTRACT

An emergency rescue request notification method using an infotainment system and a system therefor are provided. The emergency rescue request notification method in the vehicle includes detecting an accident of the vehicle, collecting information corresponding to the detected accident, generating an emergency rescue request message based on the collected information, searching for an FM radio channel with the highest receive sensitivity, changing and transmitting a program type of the found FM radio channel to a specific value using an FM radio data system (RDS) message, and transmitting the emergency rescue request message over the found FM radio channel.

20 Claims, 8 Drawing Sheets

| PROGRAM TYPE CODE | RDS PROGRAM TYPE | RBDS PROGRAM TYPE (NORTH AMERICA) |
|---|---|---|
| 0 | No programme type or undefined | No program type or undefined |
| 1 | News | News |
| 2 | Current affairs | Information |
| 3 | Information | Sports |
| 4 | Sport | Talk |
| 5 | Education | Rock |
| 6 | Drama | Classic rock |
| 7 | Culture | Adult hits |
| 8 | Science | Soft rock |
| 9 | Varied | Top 40 |
| 10 | Pop music | Country |
| 11 | Rock music | Oldies |
| 12 | Easy listening | Soft music |
| 13 | Light classical | Nostalgia |
| 14 | Serious classical | Jazz |
| 15 | Other music | Classical |
| 16 | Weather | Rhythm and blues |
| 17 | Finance | Soft rhythm and blues |
| 18 | Children's programmes | Language |
| 19 | Social affairs | Religious music |
| 20 | Religion | Religious talk |
| 21 | Phone-in | Personality |
| 22 | Travel | Public |
| 23 | Leisure | College |
| 24 | Jazz music | Spanish Talk |
| 25 | Country music | Spanish Music |
| 26 | National music | Hip Hop |
| 27 | Oldies music | Unassigned |
| 28 | Folk music | Unassigned |
| 29 | Documentary | Weather |
| 30 | Alarm test | Emergency test |
| 31 | Alarm | Emergency |

FIG.6

INFOTAINMENT SYSTEM FOR EMERGENCY RESCUE REQUEST NOTIFICATION AND METHOD THEREOF

CROSS REFERENCE TO RELATED APPLICATIONS

This application claims the benefit of priority to Korean Patent Application No. 10-2019-0151421, filed in the Korean Intellectual Property Office on Nov. 22, 2019, the entire contents of which are incorporated herein by reference.

TECHNICAL FIELD

The present disclosure relates to an emergency rescue request for the vehicle, and more particularly, relates to an emergency rescue request notification technology using an FM radio data system to transmit an emergency rescue request message to an unspecified radio listener around an accident using the FM radio data system when a vehicle emergency situation occurs.

BACKGROUND

With the wide application of computing technology in vehicles, technology development for safety and convenience of passengers including a driver is proceeding rapidly.

For convenience and safety of a user who uses the vehicle, various sensors and electronic controllers—that is, electronics—have been provided in the vehicle. Particularly, research has been actively conducted in various devices and systems for safety of vehicle passengers.

Korean Patent Laid-open Publication No. 10-2017-0029194 (an emergency rescue service providing apparatus for vehicle using a mobile terminal and a vehicle including the same) discloses technologies of transmitting emergency situation information to a mobile terminal in a short-range wireless communication scheme when the emergency rescue service providing apparatus loaded into the vehicle determines and detects an emergency situation of the vehicle and allowing the mobile terminal to transmit an emergency rescue request message to an external service server over a mobile communication network.

Furthermore, when detecting an emergency situation depending on an airbag deployment signal or the like, an existing vehicle transmits an emergency rescue request message including current location information of the vehicle to an emergency rescue center over a commercial mobile communication network by means of a communication modem loaded into the vehicle to provide an emergency rescue service.

However, to receive an existing emergency rescue service, the user should select an infotainment platform equipped with a communication modem as an option when purchasing the vehicle.

In addition, after purchasing the vehicle equipped with the infotainment platform including the communication modem, the user may not receive the emergency rescue service when he or she does not subscribe to a separate paid service after a free use period for a connected car service is finished.

Furthermore, in an existing technology, when it is impossible to use a mobile communication network due to occurrence of disasters such as natural disasters or fire, it is impossible to use the emergency rescue service using the mobile communication network.

SUMMARY

The present disclosure has been made to solve the above-mentioned problems occurring in the prior art while advantages achieved by the prior art are maintained intact.

An aspect of the present disclosure provides an emergency rescue request notification method using an FM radio data system (RDS) and a system therefor.

Another aspect of the present disclosure provides an emergency rescue request notification method using an FM RDS for providing an emergency rescue service safely and cheaply irrespective of whether a commercial mobile communication network is available and a system therefor.

Another aspect of the present disclosure provides an emergency rescue service more cheaply and safely using an FM RDS radio transmitter, which changes a program type of an RDS message to a specific value, and an FM radio receiver, which transmits an analog voice emergency rescue request message over a channel with the best receive sensitivity, such that an FM radio listener may receive the emergency rescue message when an emergency situation of the vehicle is detected.

The technical problems to be solved by the inventive concept are not limited to the aforementioned problems, and any other technical problems not mentioned herein will be clearly understood from the following description by those skilled in the art to which the present disclosure pertains.

Another aspect of the present disclosure provides an emergency rescue request notification method using an RDS and a system therefor.

According to an aspect of the present disclosure, an emergency rescue request notification method in a vehicle may include detecting an accident of the vehicle, collecting information corresponding to the detected accident, generating an emergency rescue request message based on the collected information, searching for an FM radio channel with the highest receive sensitivity, changing and transmitting a program type of the found FM radio channel to a specific value using an FM radio data system (RDS) message, and transmitting the emergency rescue request message over the found FM radio channel.

In an embodiment, the accident of the vehicle may be detected based on an airbag deployment signal.

In an embodiment, the collected information may include at least one of information about a location where an accident occurs, information about a time when the accident occurs, driver information, or predetermined contact information.

In an embodiment, the method may further include calculating a distance from a Fire Department radio station closest to the location where the accident occurs, with reference to a navigation map database and determining radio transmission signal intensity corresponding to the calculated distance. The transmitting of the emergency rescue request message over the found FM radio channel may include transmitting the emergency rescue request message with the determined radio transmission signal intensity.

In an embodiment, the generating of the emergency rescue request message based on the collected information may include generating a text message for an emergency rescue request based on the collected information and converting the text message into an analog voice message using a text to speech converter.

In an embodiment, the specific value may be a code value defined in response to alarm or emergency among program types defined in an FM RDS.

In an embodiment, the method may further include changing a frequency band based on the calculated distance. The frequency band may be changed to an ultra-short-wave band, when the calculated distance is short. The frequency band may be changed to a short-wave band, when the calculated distance is long.

In an embodiment, the method may further include determining whether it is possible to provide a connected car service before searching for the FM radio channel with the highest receive sensitivity. The FM radio channel with the highest receive sensitivity may be found when it is impossible to provide the connected car service.

In an embodiment, the method may further include transmitting the emergency rescue request message to a telematics server over a mobile communication network, when it is possible to provide the connected car service.

According to another aspect of the present disclosure, an infotainment system loaded into a vehicle may include an in-vehicle communication modem that performs in-vehicle communication with electronics of the vehicle, a MICOM that processes a signal received from the in-vehicle communication modem, a main processor that detects occurrence of a vehicle accident based on a signal received from the MICOM and generates an emergency rescue request message corresponding to the detected vehicle accident, an FM RDS radio transmitter that transmits an FM RDS message, in which a program type of an FM radio channel with the highest receive sensitivity is changed to a specific value, under control of the main processor, and an FM radio transmitter that transmits the emergency rescue request message over the FM radio channel with the highest receive sensitivity.

In an embodiment, the FM RDS radio transmitter or the FM radio transmitter may search for the FM radio channel with the highest receive sensitivity.

In an embodiment, the main processor may determine that an accident occurs in the vehicle, when an airbag deployment signal generated by an airbag control unit is received from the MICOM.

In an embodiment, the infotainment system may further include a global positioning system (GPS) module that provides information about a location where an accident of the vehicle occurs and information about a time when the accident of the vehicle occurs and a memory that maintains default information corresponding to the vehicle and map information. The main processor may generate the emergency rescue request message in the form of text based on at least one of the information about the location where the accident occurs, information about the time when the accident occurs, the default information, or the map information.

In an embodiment, the main processor may calculate a distance from a Fire Department radio station closest to the location where the accident occurs, with reference to the map information, may determine radio transmission signal intensity corresponding to the calculated distance, and may control to transmit a message with the determined radio transmission signal intensity.

In an embodiment, the main processor may convert the emergency rescue request message in the form of text into an analogy voice message using a text to speech converter provided in the infotainment system and may provide the analog voice message to the FM radio transmitter.

In an embodiment, the specific value may be a code value defined in response to alarm or emergency among program types defined in an FM RDS.

In an embodiment, the main processor may change a frequency band based on the calculated distance. The main processor may change the frequency band to an ultra-short-wave band, when the calculated distance is short, and may change the frequency band to a short-wave band, when the calculated distance is long.

In an embodiment, the main processor may determine whether it is possible to provide a connected car service before searching for the FM radio channel with the highest receive sensitivity and may control to search for the FM radio channel with the highest receive sensitivity when it is impossible to provide the connected car service.

In an embodiment, the main processor may control to transmit the emergency rescue request message via a mobile communication module provided in the infotainment system, when it is possible to provide the connected car service.

In an embodiment, the airbag deployment signal may be encoded into a controller area network (CAN) or Ethernet signal and may be received in the in-vehicle communication modem via a central gateway or a cluster.

BRIEF DESCRIPTION OF THE FIGURES

The above and other objects, features and advantages of the present disclosure will be more apparent from the following detailed description taken in conjunction with the accompanying drawings:

FIG. 6 is a drawing illustrating a program type defined in an FM RDS according to an embodiment.

DETAILED DESCRIPTION

Figure 1:
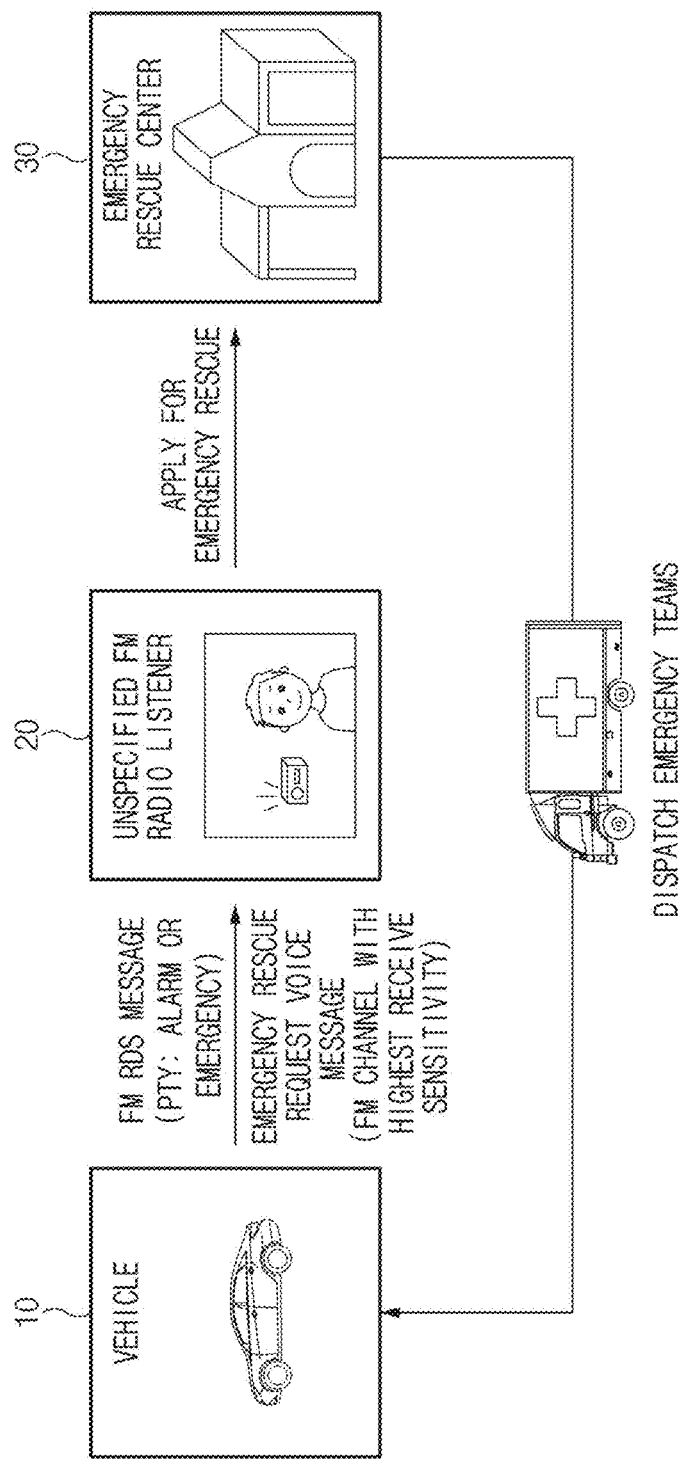
FIG. 1 is a drawing illustrating a configuration of the entire system for providing a vehicle emergency rescue service according to an embodiment.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 7B.

FIG. 1 is a drawing illustrating a configuration of the entire system for providing a vehicle emergency rescue service according to an embodiment.

Referring to FIG. 1, when a vehicle accident is detected according to a sensing signal of specific electronics of a vehicle 10, for example, an airbag control unit (ACU), an infotainment platform (or an infotainment system) provided in the vehicle 10 may receive a certain accident sensing signal, for example, an airbag deployment signal.

As an embodiment, the infotainment platform may be implemented in form of a head unit, in the form of an audio, video, and navigation (AVN) system, or in the form of being embedded in the AVN system, but not limited thereto.

As an example, when an airbag control module (ACM) (or an airbag control unit) provided in the vehicle 10 detects an impact outside the vehicle 10, which is greater than or equal to a reference value, it may deploy a corresponding airbag. The ACM may transmit a certain airbag deployment signal to the infotainment platform via a cluster and/or a central gateway (CGW) provided in the vehicle 10.

The infotainment platform may perform an emergency rescue request notification procedure depending on the received airbag deployment signal.

The CGW and various electric control units (ECUs) which are electronics of the vehicle 10 may be connected to each other over an in-vehicle network to exchange information.

As an example, the in-vehicle network may include, but is not limited to, a controller area network (CAN), and may further include at least one of Ethernet, a local interconnect network (LIN), or FlexRay.

When receiving the airbag deployment signal, the infotainment platform may obtain information about a current location of an area where an accident occurs and time information at a time when the accident occurs, via a global positioning system (GPS) module provided therein.

The infotainment platform may identify a channel with the best FM signal receive sensitivity in the area where the accident occurs.

The infotainment platform may convert a program type of an FM channel with the highest receive sensitivity into a program type corresponding to an emergency disaster rescue through an FM radio data system (RDS) message.

As an example, when an FM channel with the highest receive sensitivity is used for a music broadcast when detecting occurrence of a vehicle accident, the infotainment platform may change a program type of the FM channel to program type code 31 of FIG. 6 described below, using an FM RDS message. Herein, program type code 31 is a value reserved for an urgent announcement when natural disasters or other major disasters occur and means that an RDS program type is alarm. For a radio broadcast data system (RBDS) of North America, program type code 31 means that the RDS program type is emergency.

The RDS is a communication protocol standard for distributing and propagating a small amount of digital information (data) to an FM radio broadcast signal. A type of information included in an RDS message may be identified by a program type code.

The RBDS standard of North America is almost identical to the RDS standard, and major differences between the RBDS standard and the RDS standard are that program types defined for news, sports, pop music, jazz music, and the like differ from each other, as shown in FIG. 6 described below.

The infotainment platform may obtain information about a detailed address of a point where an accident occurs and information about facilities around the point where the accident occurs, with reference to a navigation map database.

The infotainment platform may obtain information about a vehicle, an accident of which occurs, with reference to an internal memory. Herein, the information about the vehicle, the accident of which occurs, may include a vehicle license number, a vehicle identification number (VIN), a vehicle type, a vehicle owner and/or a driver name, a contact, and the like.

The infotainment platform may generate an emergency rescue request message in the form of text based on the collected information.

The infotainment platform may convert the text message into an analog voice message using a text to speech (TTS) engine provided therein.

The infotainment platform may change a channel with the best FM signal receive sensitivity in an area where an accident occurs to an emergency rescue broadcast reception mode.

In detail, the infotainment platform may convert a program type of an RDS message into alarm or emergency such that a corresponding channel listener may receive an emergency rescue request message over the channel with the best FM signal receive sensitivity, thus controlling such that an FM radio listener near an area where an accident occurs may receive the emergency rescue request message.

An unspecified radio listener 20 near an area where an accident occurs—for example, the National Fire Agency or a general listener—may listen to an emergency rescue voice message over the same broadcast channel he or she is listening to and may apply for emergency rescue to an emergency rescue center 30 such as the nearby fire station and/or police station.

The emergency rescue center 30 may form an emergency team depending on the emergency rescue application, and may dispatch the emergency team to the accident vehicle 10.

Figure 2:
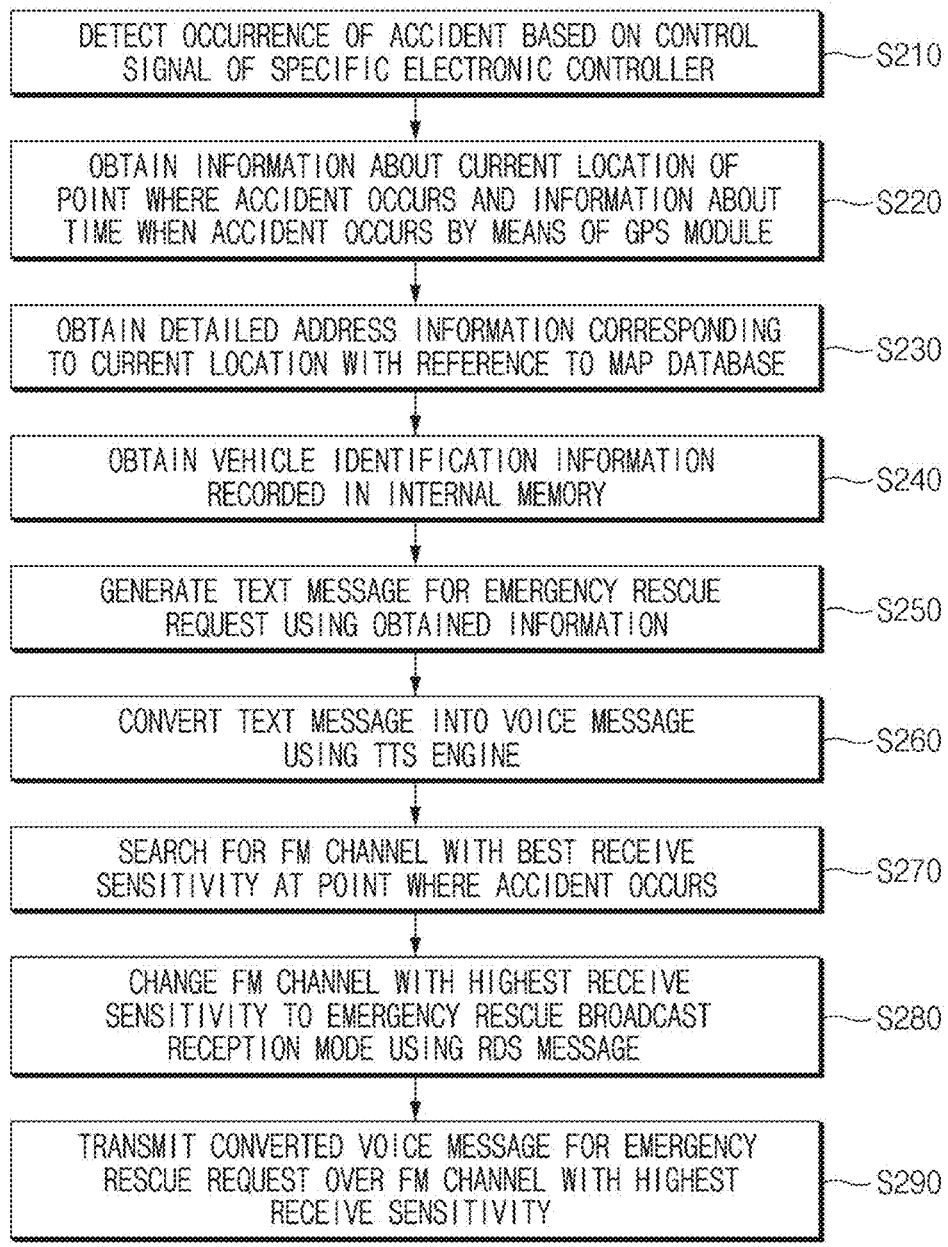
FIG. 2 is a flowchart illustrating an emergency rescue request notification procedure using an FM radio data system (RDS) in a vehicle infotainment system according to an embodiment.

FIG. 2 is a flowchart illustrating an emergency rescue request notification procedure using an FM RDS in a vehicle infotainment system according to an embodiment.

Referring to FIG. 2, in S210, an infotainment system of a vehicle may detect occurrence of an accident based on a control signal of a specific electronic controller loaded into the vehicle.

As an example, an airbag control unit, which deploys at least one airbag loaded into the vehicle depending to an external impact, may transmit an airbag deployment signal to an infotainment platform (or an infotainment system) over an in-vehicle network, when an airbag is deployed according to an external impact such as a rear-end collision. In this case, when the airbag deployment signal is received, the infotainment platform may determine that a rear-end collision accident of the vehicle occurs.

In S220, the infotainment system may obtain information about a current location of a point where an accident occurs and information about a time when the accident occurs, by means of a GPS module provided therein.

In S230, the infotainment system may obtain detailed address information corresponding to the current location with reference to a map database stored in an internal memory.

In S240, the infotainment system may obtain vehicle identification information recorded in the internal memory.

In S250, the infotainment system may generate a text message for an emergency rescue request using the information obtained in S220 to S240.

In S260, the infotainment system may convert the text message into an analog voice message using a TTS engine provided therein.

In S270, the infotainment system may search for an FM channel with the best receive sensitivity at the point where the accident occurs.

In S280, the infotainment system may change the FM channel with the highest receive sensitivity to an emergency rescue broadcast reception mode using an RDS message.

In an embodiment, the infotainment system may set a value of a program type (PTY) field of the RDS message to a code value—that is, 31—corresponding to alarm or emergency and may wirelessly transmit the RDS message, such that a listener of the FM channel may receive the emergency rescue request message transmitted from the accident vehicle.

In S290, the infotainment system may wirelessly transmit the voice message converted in S260 over the FM channel with the highest receive sensitivity.

When the listener who receives the emergency rescue request message applies for emergency rescue to an emergency rescue center—for example, a fire station or/and a police station, the emergency rescue center may dispatch emergency rescue personnel to the accident vehicle which requests emergency rescue.

Figure 3:
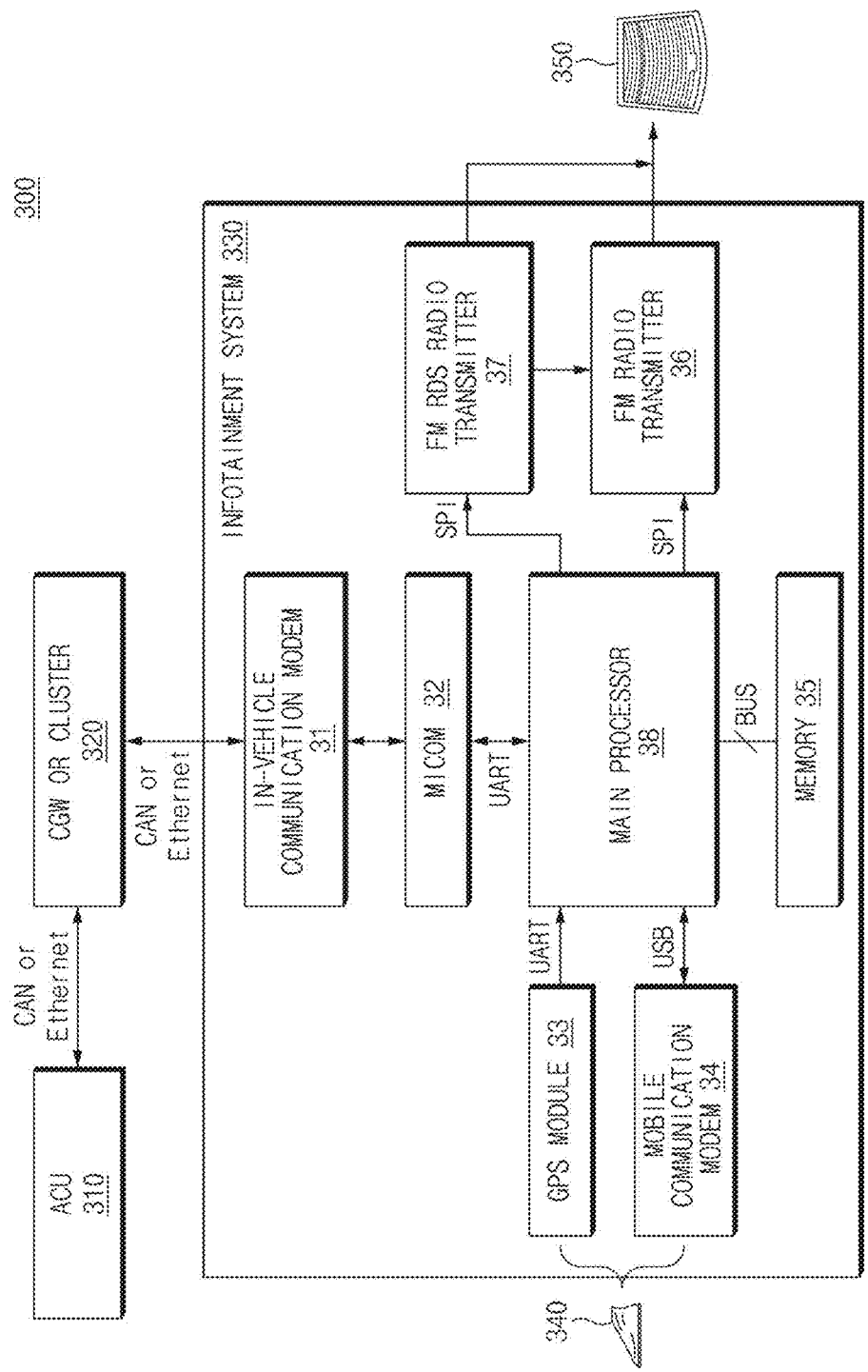
FIG. 3 is a block diagram illustrating an emergency rescue request notification system of a vehicle according to an embodiment.

FIG. 3 is a block diagram illustrating an emergency rescue request notification system of a vehicle according to an embodiment.

Referring to FIG. 3, an emergency rescue request notification system 300 may be configured to roughly include an airbag control unit (ACU) 310, a central gateway (CGW) or a cluster 320, an infotainment system or an infotainment platform 330, an external integrated antenna 340, and a radio antenna 350. Herein, the radio antenna 350 may be, but is not limited to, a glass antenna capable of transmitting and receiving a signal of an AM radio frequency band and/or a signal of an FM radio frequency band.

The infotainment system 330 may be configured to include an in-vehicle communication modem 31, a microcomputer (MICOM) 32, a GPS module 33, a mobile communication modem 34, a memory 35, an FM radio transmitter 36, an FM RDS radio transmitter 37, and a main processor 38.

The GPS module 33 and the MICOM 32 may perform universal asynchronous receiver/transmitter (UART) communication for converting a format of parallel data in a serial mode to transmit the data with the main processor 38. The mobile communication modem 34 and the main processor 38 may perform universal serial bus (USB) communication.

The FM radio transmitter 36 and the FM RDS radio transmitter 37 may be connected with the main processor 38 by a serial peripheral interface (SPI) bus. The memory 35 and the main processor 38 may perform general bus communication.

The ACU 310, the CGW 320, and the infotainment system 330 may be connected to each other over an in-vehicle network to exchange information. As an example, the in-vehicle network may include, but is not limited to, a controller area network (CAN), Ethernet, or the like.

The CGW 320 may function as a controller for exchanging signals between electronics in a vehicle. Herein, the function of the CGW 320 may be embedded in a cluster.

When an airbag is deployed according to a rear-end collision accident of the vehicle or the like, the ACU 310 may transmit an airbag deployment signal to the infotainment system 330 via the CGW 320.

The in-vehicle communication modem 31 of the infotainment system 330 may be a transceiver for modulating and demodulating signals received from external electronics, which may demodulate a signal received from the CGW 320 to deliver the demodulated signal to the MICOM 32 or may modulate a message received from the MICOM 32 to transmit the modulated signal to other electronics via the CGW 320. In an embodiment, the in-vehicle communication modem 31 may be provided with a modem for modulating and demodulating a CAN signal or a modem for modulating and demodulating an Ethernet signal.

The GPS module 33, which processes a GPS signal, and the mobile communication module 34, which processes a mobile communication signal, may be connected with the external integrated antenna 340.

The external integrated antenna 340 may be composed by integrating a first antenna for receiving a GPS satellite signal and a second antenna for transmitting and receiving a wireless signal with a mobile communication base station into one.

The GPS module 33 may demodulate a GPS signal received via the first antenna under control of the main processor 38 to obtain latitude/longitude/time information and may deliver the obtained latitude/longitude/time information to the main processor 38.

The mobile communication module 34 may transmit and receive a wireless signal with a mobile communication base station (or a short-range wireless communication access point (AP) for example, a Wi-Fi AP). As an example, the mobile communication module 34 may communicate with a wideband code division multiple access (WCDMA) base station, a long-term evolution (LTE) base station, a new radio (NR) base station, or the like.

The memory 35 may maintain various program execution files and data necessary for an operation of the infotainment system 330.

As an example, the memory 35 may maintain vehicle related information, a navigation map database, or the like. The vehicle related information may include, but is not limited to, information about a vehicle license plate, information about a vehicle owner, emergency contact information, or the like.

The FM radio transmitter 36 may generate a voice signal through an FM frequency band and may transmit the voice signal via the radio antenna 350.

As an example, when receiving a voice message for an emergency rescue request from the main processor 38, the FM radio transmitter 36 may transmit the received voice message over an FM channel with the highest receive sensitivity.

The main processor 38 may generate an emergency rescue request message in the form of text based on the current location and time information obtained from the GPS module 33 and vehicle related information or the like stored in the memory 35.

The main processor 38 may convert the emergency rescue request message in the form of text into an analog voice signal using a text to speech (TTS) converter—that is, a TTS engine—loaded into the infotainment system 330.

The main processor 38 may calculate a distance from a Fire Department radio station closest to a location where an accident occurs, with reference to the navigation map database, may determine radio transmission signal intensity corresponding to the calculated distance, and may control to transmit a message with the determined radio transmission signal intensity.

Furthermore, the main processor 38 may change a frequency band based on the calculated distance. The main processor 38 may change the frequency band to an ultra-short-wave band, when the calculated distance is short, and may change the frequency band to a short-wave band, when the calculated distance is long.

The FM RDS radio transmitter 37 may change a program type—that is, PTY—field value of an RDS message depending on a certain control signal of the main processor 38.

The FM radio transmitter 36 according to an embodiment may search for the FM channel with the best receive sensitivity depending on the control signal of the main processor 38, but it is merely one embodiment. In another embodiment, the FM RDS radio transmitter 37 may search for an FM channel with the best receive sensitivity depending on a control signal of the main processor 38.

The main processor 38 may determine whether there is a need for an emergency rescue request based on the message received from the MICOM 32. As an example, when receiving a control signal indicating that an airbag deployment signal is received from the MICOM 32, the main processor 38 may determine that there is the need for the emergency rescue request.

The main processor 38 may control the FM radio transmitter 36 (or the FM RDS radio transmitter 37) to search for an FM channel with the best receive sensitivity.

When there is the need for the emergency rescue request, the main processor 38 may transmit a certain program type change command to the FM RDS radio transmitter 37 such that the FM RDS radio transmitter 37 changes a program type of the FM channel with the highest receive sensitivity to alarm or emergency.

When the program type is changed by the FM RDS radio transmitter 37, the FM radio transmitter 36 may transmit an emergency rescue request voice message over the FM channel with the highest receive sensitivity.

The infotainment system 330 according to an embodiment of the present disclosure may control to transmit the emergency rescue request voice message over the FM channel with the highest receive sensitivity, thus improving a probability that an unspecified radio listener around a point where the accident occurs may receive the rescue request message for the vehicle accident over the FM radio channel.

Furthermore, the infotainment system 330 according to an embodiment of the present disclosure may control such that an FM radio listener may automatically receive a rescue request message via an FM RDS although it is impossible to transmit an emergency rescue request over a mobile communication network, thus improving a probability that a passenger will be rescued by emergency upon a vehicle accident to secure the safety of the passenger and protect the life of the passenger.

When a vehicle accident occurs, the infotainment system 330 according to an embodiment may provide an emergency rescue request on a display having a certain user interface for allowing a user to optionally set whether to provide the emergency rescue request over a mobile communication network (or a telematics communication network) or the FM RDS.

To this end, the infotainment system 330 may further a touch display (not shown) capable of receiving a touch input.

The above-mentioned embodiment is exemplified as the FM radio transmitter 36 or the FM RDS radio transmitter 37 searches for the FM channel with the highest receive sensitivity under control of the main processor 38, but it is merely one embodiment. In another embodiment, an FM receiver (not shown) for listening to an RF radio or a separate FM receive sensitivity search device (not shown) may search for an FM channel with the highest receive sensitivity depending on a control signal of the main processor 38.

Figure 4:
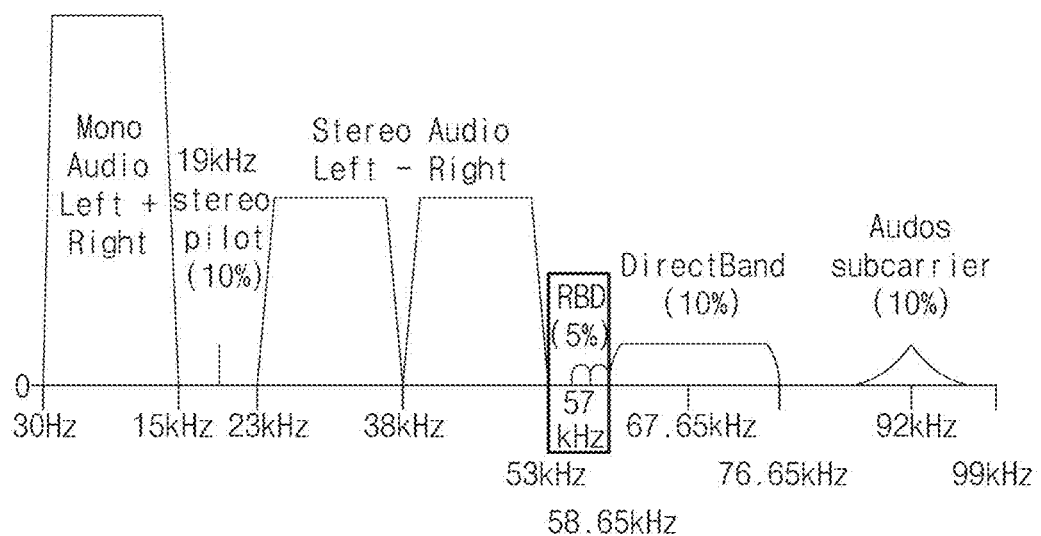
FIG. 4 is a drawing illustrating baseband frequency allocation of an FM RDS or an FM radio broadcast data system (RBDS) according to an embodiment.

FIG. 4 is a drawing illustrating baseband frequency allocation of an FM RDS or an FM RBDS according to an embodiment.

Referring to FIG. 4, a bandwidth for transmitting an RDS or RBDS message may be allocated to the 57 Hz band corresponding to about 5% of the entire FM baseband.

Figure 5:
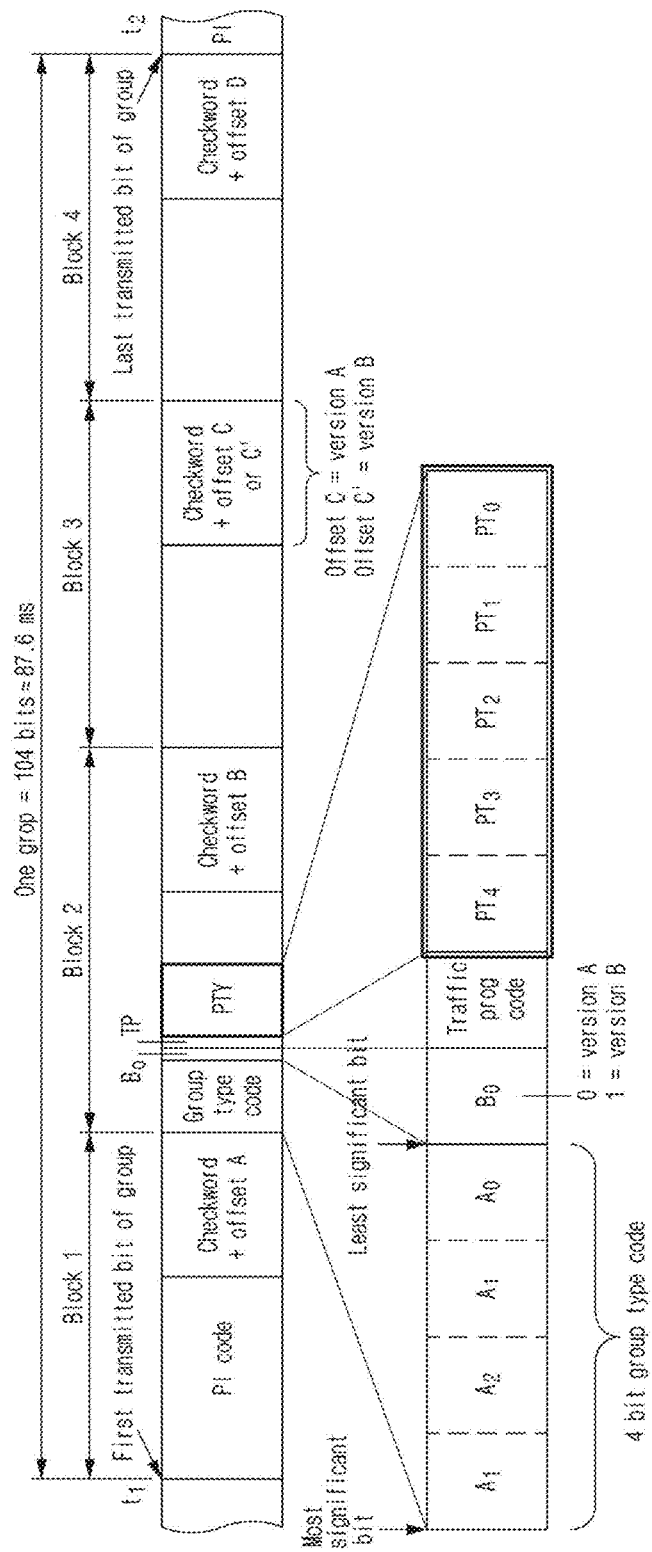
FIG. 5 is a drawing illustrating a message structure of an FM RDS according to an embodiment.

FIG. 5 is a drawing illustrating a message structure of an FM RDS according to an embodiment.

Referring to FIG. 5, an RDS message according to an embodiment may be divided for each group.

One group may be composed of a total of 104 bits and may have a length of about 87.6 ms.

One group may be composed of a total of four blocks—that is, first to four blocks —, each of which has a length of 26 bits.

Each block may include a checkword (or checksum) field for error detection of the corresponding block and an offset field for synchronization between a block and a group. The checksum field and the offset field of each block may have a length of 10 bits.

The first block (Block 1) may include a 16-bit program identification (PI) code for identifying a station.

The second block (Block 2) may include a 4-bit group type code field, a 1-bit version code field, a 1-bit traffic program identification code field, a 5-bit program type (PTY) field.

FIG. 6 is a drawing illustrating a program type defined in an FM RDS according to an embodiment.

Referring to FIG. 6, an RDS program type code may consist of a total of 5 bits and a total of 31 program types may be defined.

Program type code 31 is reserved for an urgent announcement when natural disasters or other major disasters occur.

When detecting a vehicle accident, an infotainment system according to an embodiment may change and set a program type code of an FM radio channel with the highest receive sensitivity to 31, such that a listener of the FM radio channel may receive an emergency rescue request message.

Figure 7A:
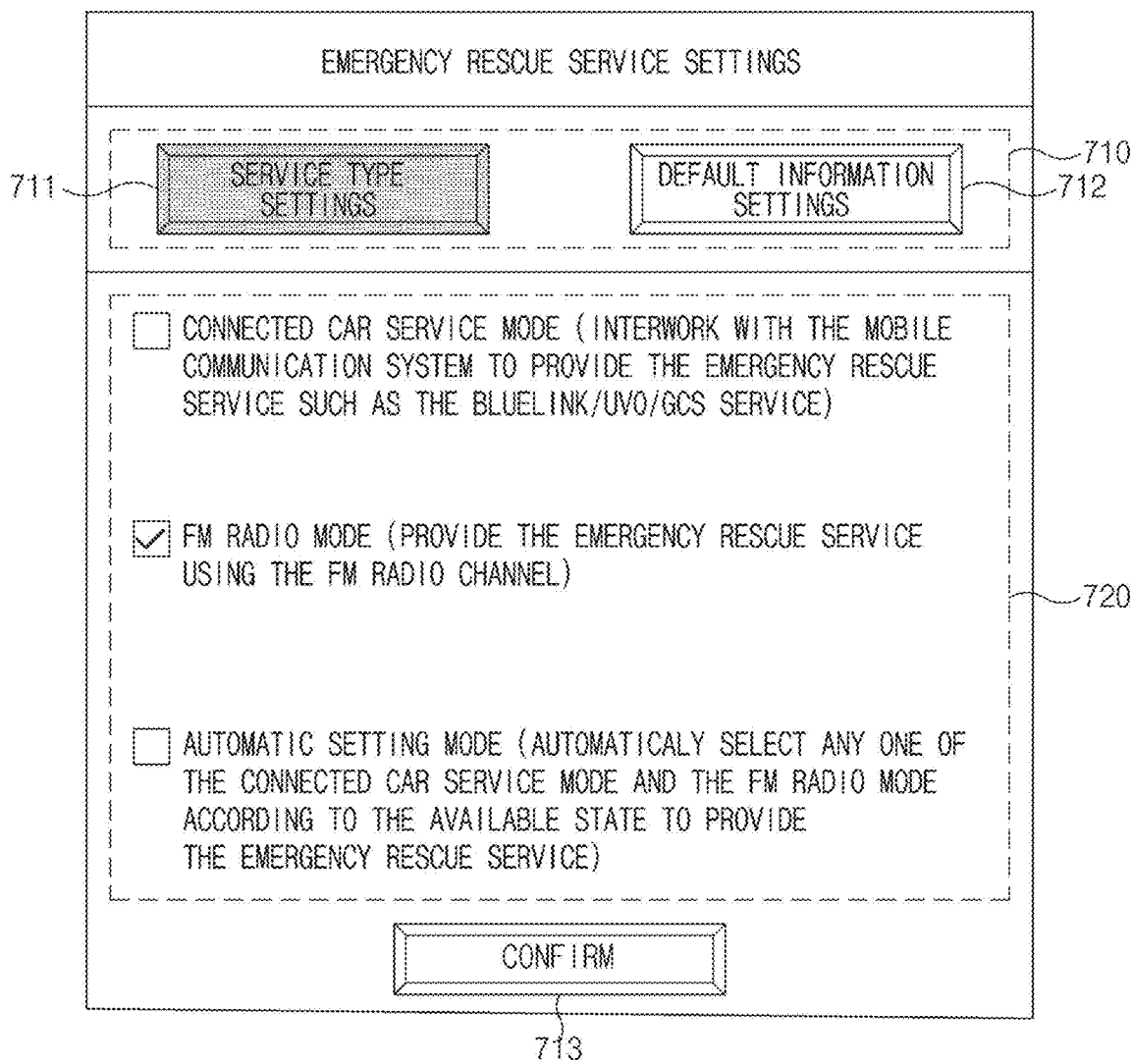
FIGS. 7A and 7B are drawings illustrating an emergency rescue service configuration screen according to an embodiment.
Figure 7B:
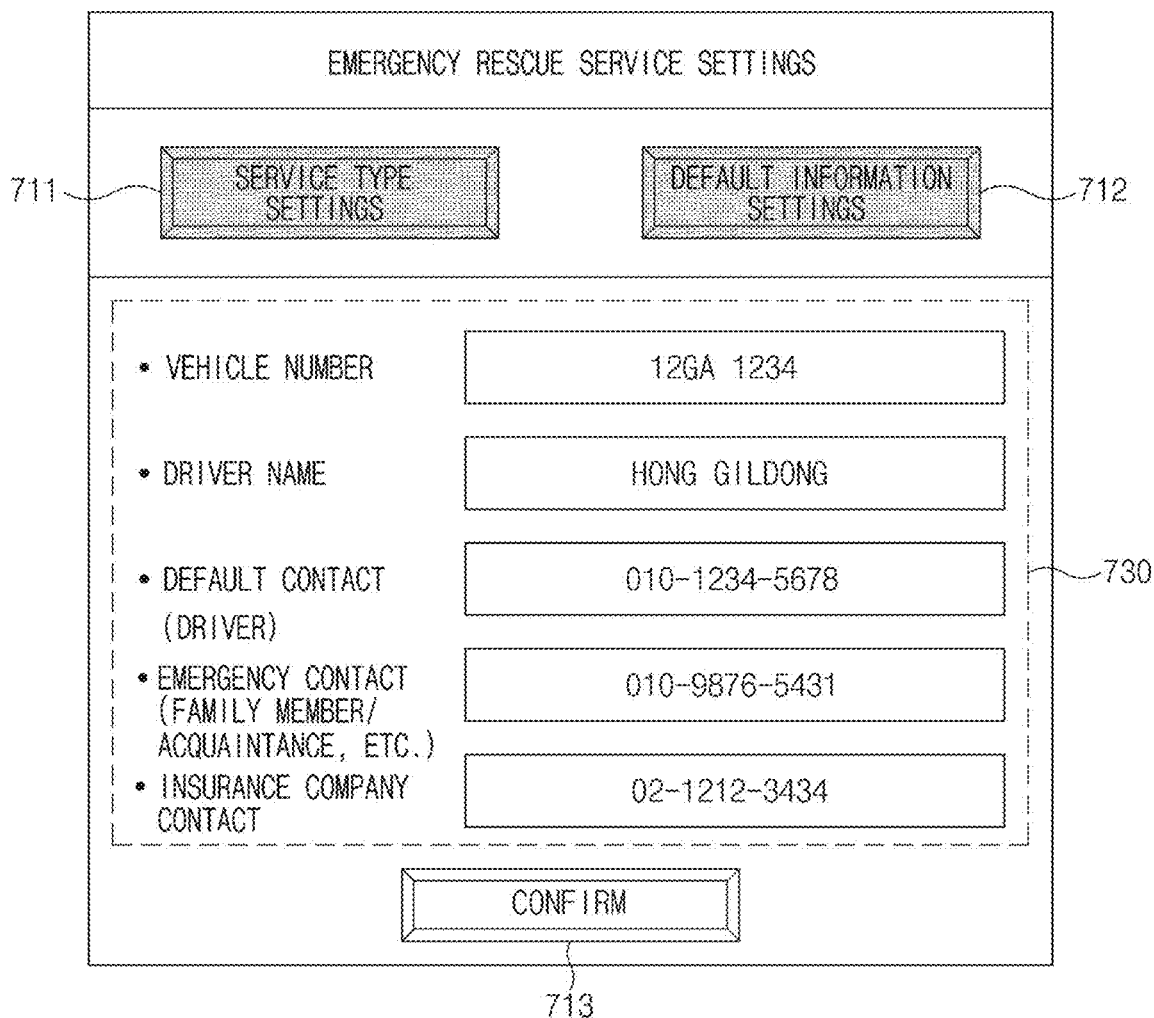

FIGS. 7A and 7B are drawings illustrating an emergency rescue service configuration screen according to an embodiment.

Referring to FIG. 7A, an emergency rescue service configuration screen may be roughly divided into a menu selection button display area 710 and a user setting area 720.

The menu selection button display area 710 may include a service type setting button 711 and a default information setting button 712.

When a user selects the service type setting button 711, a selectable emergency rescue service mode may be displayed on the user setting area 720. When selecting a desired mode and selecting a confirm button 713, the user may set an emergency rescue service mode.

As an example, the user may select one of a connected car service mode, an FM radio mode, or an automatic setting mode.

When the connected car service mode is selected, a corresponding vehicle may interwork with a telematics server and may provide an emergency rescue service, for example, the BlueLink service of Hyundai Motors, the UVO service of KIA motors, or Genesis Connected Services (GCS), over a mobile communication network.

When the FM radio mode is selected, a corresponding vehicle may provide an emergency rescue service using an FM RDS message and an FM radio channel.

When the automatic setting mode is selected, a corresponding vehicle may automatically set one of the connected car service mode or the FM radio mode based on a state where a mobile communication system and an FM RDS are currently available to provide an emergency rescue service.

As shown in FIG. 7B, the user may select the default information setting button 712 to set default information.

As shown in reference number 730, the user may enter a vehicle number, a driver name, a default contact—for example, a driver contact —, an emergency contact—for example, a contact of a family member or an acquaintance —, an insurance company contact, or the like and may select a confirm button 713 to set default information.

The default information set by the user may be stored and maintained in a memory of the infotainment system.

Although it has been described that all components configuring the exemplary embodiment of the present disclosure are combined with each other as one component or are combined and operated with each other as one component, the present disclosure is not necessarily limited to the above-mentioned exemplary embodiment. That is, all the components may also be selectively combined and operated with each other as one or more component without departing from the scope of the present disclosure. In addition, although each of all the components may be implemented by one independent hardware, some or all of the respective components which are selectively combined with each other may be implemented by a computer program having a program module performing some or all of functions combined with each other in one or plural hardware. Codes and code segments configuring the computer program may be easily inferred by those skilled in the art to which the present disclosure pertains. The computer program is stored in computer readable media and is read and executed by a computer, thereby making it possible to implement the exemplary embodiment of the present disclosure. An example of the computer readable media may include magnetic recording media, optical recording media, or the like.

In addition, hereinabove, the terms "include", "configure", "have", or the like, are to be interpreted to imply the inclusion of other components rather than the exclusion of other components, since they mean that a corresponding component may be included unless particularly described otherwise. Unless defined otherwise, all the terms including technical and scientific terms have the same meaning as meanings generally understood by those skilled in the art to which the present disclosure pertains. Generally used terms such as terms defined in a dictionary should be interpreted as the same meanings as meanings within a context of the related art and should not be interpreted as ideally or excessively formal meanings unless clearly defined in the present specification.

The above-mentioned emergency rescue request notification method using the infotainment system may be implemented as a computer readable code in computer readable storage media. The computer readable storage media may include all types of storage media which store data decoded by a computer system. For example, there may be a read only memory (ROM), a random access memory (RAM), a magnetic tape, a magnetic disc, a flash memory, an optical data storage, and the like. Furthermore, the computer readable storage media may be distributed to a computer system connected over a computer communication network to be stored as a code readable in a distributed manner and be downloaded and executed in a corresponding device.

A description will be given of effects on the method and system according to embodiments of the present disclosure.

An embodiments of the present disclosure may provide an emergency rescue request notification method using an FM radio data system (RDS) and a system therefor.

Furthermore, an embodiment of the present disclosure may provide an emergency rescue request notification method using an FM RDS, which is capable of providing a vehicle emergency rescue service safely and cheaply over an FM radio channel irrespective of whether a connected car service is available over a mobile communication network and a system therefor.

Furthermore, an embodiment of the present disclosure may provide a more inexpensive and safe emergency rescue service without using a commercial mobile communication network by providing an FM RDS radio transmitter, which changes a program type of an RDS message to a specific value, and an FM radio receiver, which transmits an analog voice emergency rescue request message over a channel with the best receive sensitivity, such that an FM radio listener may receive the emergency rescue message when an emergency situation of the vehicle is detected.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. An emergency rescue request notification method in a vehicle, the method comprising:
   detecting a signal indicating an accident of the vehicle;
   collecting information corresponding to the detected accident;
   generating an emergency rescue request message based on the collected information;
   searching for an FM radio channel with a highest receive sensitivity;
   changing and transmitting a program type of the found FM radio channel to a specific value using an FM radio data system (RDS) message;
   calculating a distance from a Fire Department radio station closest to a location where the accident occurs, with reference to a navigation map database;

determining radio transmission signal intensity corresponding to the calculated distance; and transmitting the emergency rescue request message generated based on the collected information over the found FM radio channel.

2. The method of claim 1, wherein the signal is an airbag deployment signal.

3. The method of claim 2, further comprising:
transmitting the emergency rescue request message to a telematics server over a mobile communication network, when it is possible to provide the connected car service.

4. The method of claim 1, wherein the collected information includes at least one of information about the location where the accident occurs, information about a time when the accident occurs, driver information, or predetermined contact information.

5. The method of claim 4,
wherein the transmitting of the emergency rescue request message over the found FM radio channel includes:
transmitting the emergency rescue request message with the determined radio transmission signal intensity.

6. The method of claim 5, wherein the generating of the emergency rescue request message based on the collected information includes:
generating a text message for an emergency rescue request based on the collected information; and
converting the text message into an analog voice message using a text to speech converter.

7. The method of claim 5, further comprising:
changing a frequency band based on the calculated distance,
wherein the frequency band is changed to an ultra-short-wave band, when the calculated distance is short, and
wherein the frequency band is changed to a short-wave band, when the calculated distance is long.

8. The method of claim 1, wherein the specific value is a code value defined in response to alarm or emergency among program types defined in an FM RDS.

9. The method of claim 1, further comprising:
determining whether it is possible to provide a connected car service before searching for the FM radio channel with the highest receive sensitivity;
wherein the FM radio channel with the highest receive sensitivity is found when it is not possible to provide the connected car service.

10. An infotainment system loaded into a vehicle, the infotainment system comprising:
an in-vehicle communication modem configured to perform in-vehicle communication with electronics of the vehicle;
a microcomputer (MICOM) configured to process a signal received from the in-vehicle communication modem;
a main processor configured to detect occurrence of a vehicle accident based on a signal received from the MICOM and to generate an emergency rescue request message corresponding to the detected vehicle accident;
wherein the main processor calculates a distance from a Fire Department radio station closest to a location where the accident occurs, with reference to the map information, and determines radio transmission signal intensity corresponding to the calculated distance;
an FM RDS radio transmitter configured to transmit an FM RDS message, in which a program type of an FM radio channel with the highest receive sensitivity is changed to a specific value, under control of the main processor; and
an FM radio transmitter configured to transmit the emergency rescue request message generated over the FM radio channel with the highest receive sensitivity.

11. The infotainment system of claim 10, wherein the FM RDS radio transmitter or the FM radio transmitter searches for the FM radio channel with the highest receive sensitivity.

12. The infotainment system of claim 11, wherein the main processor determines whether it is possible to provide a connected car service before searching for the FM radio channel with the highest receive sensitivity, and searches for the FM radio channel with the highest receive sensitivity when it is not possible to provide the connected car service.

13. The infotainment system of claim 12, wherein the main processor controls to transmit the emergency rescue request message via a mobile communication module provided in the infotainment system, when it is possible to provide the connected car service.

14. The infotainment system of claim 10, wherein the main processor determines that an accident occurs in the vehicle, when an airbag deployment signal generated by an airbag control unit is received from the MICOM.

15. The infotainment system of claim 14, wherein the airbag deployment signal is encoded into a controller area network (CAN) or Ethernet signal and is received in the in-vehicle communication modem via a central gateway or a cluster.

16. The infotainment system of claim 10, further comprising:
a global positioning system (GPS) module configured to provide information about the location where the accident of the vehicle occurs and information about a time when the accident of the vehicle occurs; and
a memory configured to maintain default information corresponding to the vehicle and map information;
wherein the main processor generates the emergency rescue request message in the form of text based on at least one of the information about the location where the accident occurs, information about the time when the accident occurs, the default information, or the map information.

17. The infotainment system of claim 16, wherein the main processor controls to transmit a message with the determined radio transmission signal intensity.

18. The infotainment system of claim 17, wherein the main processor converts the emergency rescue request message in the form of text into an analog voice message using a text to speech converter provided in the infotainment system and provides the analog voice message to the FM radio transmitter.

19. The infotainment system of claim 17, wherein the main processor changes a frequency band based on the calculated distance, and
wherein the main processor changes the frequency band to an ultra-short-wave band, when the calculated distance is short, and changes the frequency band to a short-wave band, when the calculated distance is long.

20. The infotainment system of claim 10, wherein the specific value is a code value defined in response to alarm or emergency among program types defined in an FM RDS.

* * * * *